United States Patent Office 2,819,933
Patented Jan. 14, 1958

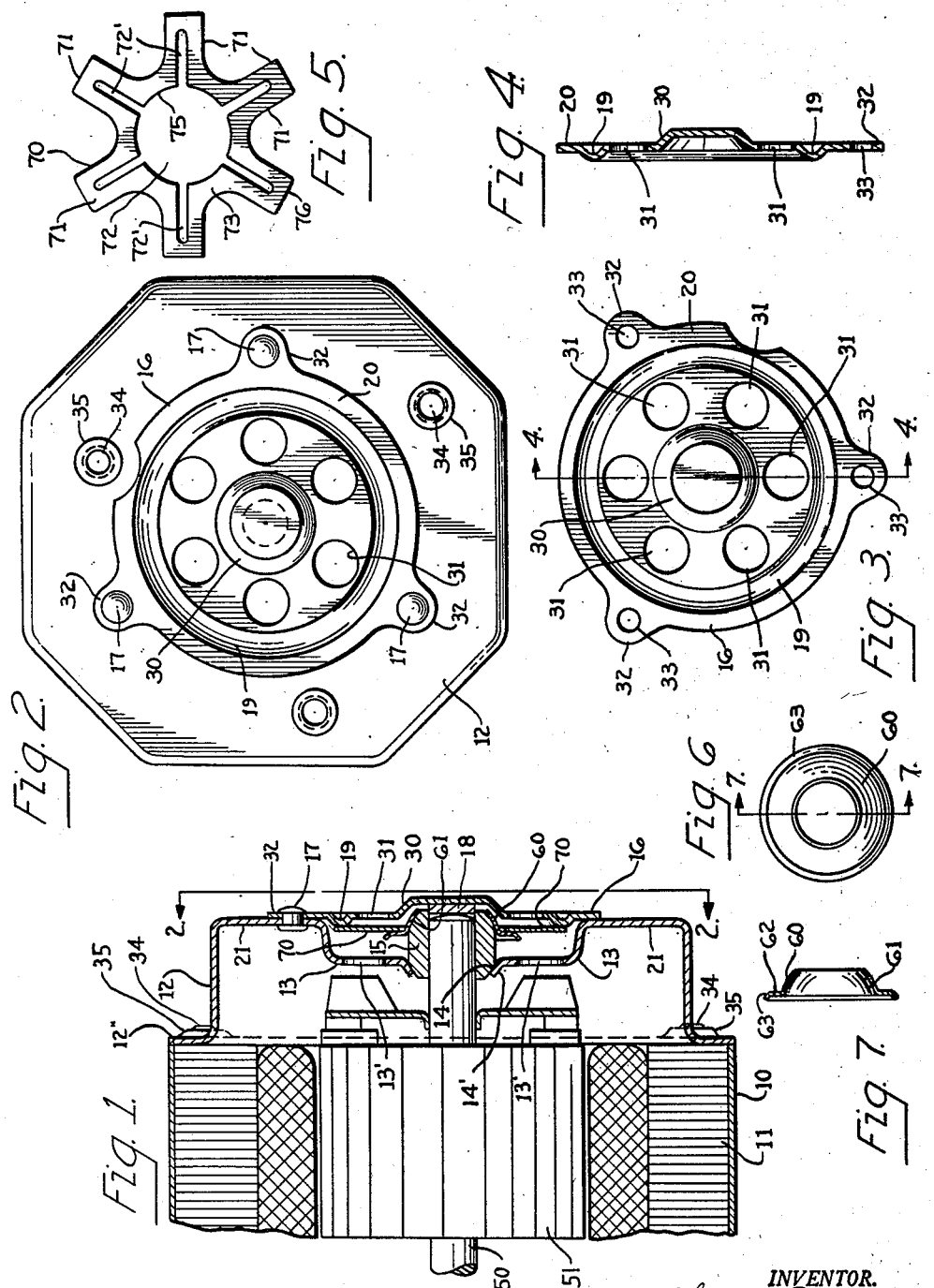

2,819,933

BEARING STRUCTURE

Blake W. Carrington, Elyria, Ohio, assignor to The General Industries Company, Elyria, Ohio, a corporation of Ohio Application July 29, 1954, Serial No. 446,621

3 Claims. (Cl. 308—72)

My invention relates to bearing structures, and relates more particularly to bearing structures which are self-aligning. Bearings of this type are particularly applicable for supporting armature shafts and small electric motors.

It has been found relatively difficult and expensive to properly align rigidly constructed bearings for small electric motors and similar apparatus so that the use of self-aligning bearings on such type motors reduces the initial expense of assembly and eliminates close machining of the bearing parts necessary on rigid or fixed bearings.

I have designed a bearing of the self-aligning type in which the bearing aligns itself with the shaft axis with a minimum of effort.

It is a further object of my invention to provide a bearing structure for rotatable shafts wherein vibrations within the bearing are largely eliminated.

Another object of my invention is to provide an improved bearing structure of this type which can be economically manufactured and assembled without requiring accurate machining of the parts of the bearing mounting.

Another object of my invention is to provide an improved bearing structure wherein the rotor of an electric motor may be located as nearly central in the stator bore as possible.

Another object of my invention is to provide an improved bearing structure of this type wherein the cover is lined up with respect to the stator and may be formed in a single operation thereby permitting the maximum theoretical attainable concentricity.

Other objects of my invention and the invention itself will become increasingly apparent from a consideration of the following description and drawings, wherein Fig. 1 is a medial longitudinal sectional view through the housing of a motor having my improved bearing structure incorporated therein, a portion only of such motor being shown;

Fig. 2 is an end elevational view taken on the line 2—2 of Fig. 1;

Fig. 3 is a top plan view of the upper bearing retainer element as shown in Fig. 2;

Fig. 4 is a view taken on the line 4—4 of Fig. 3;

Fig. 5 is a top plan view of the bearing retainer spring shown in Fig. 1;

Fig. 6 is a view of element shown in Fig. 1; and

Fig. 7 is a view taken on the line 7—7 of Fig. 6.

Referring now to the drawings, in all of which like parts are designated by like reference characters, in Fig. 1 I have illustrated a comparatively small electric motor of the so-called "frictional" type, such as is commonly used in operating a fan of an air heater for vehicles or for similar purposes.

Although I have chosen to illustrate my improved bearing structure in a motor of this type, it will be understood that it is equally applicable to various other purposes for supporting a rotatable shaft and where it is desirable to have the bearing self-aligning.

The motor 10 comprises a generally cylindrical central housing portion 11 and a pair of end plates 12—12. Said end plates 12—12 are each provided with a centrally disposed inwardly dished bearing seat portion 13, centrally perforated as illustrated at 14 and having the inner peripheral portions 14' adjacent the perforation 14 curved inwardly and downwardly to provide a shoulder for the lower or in-board end of a cylindrical or ball-shaped bearing 15 have beveled ends. Cover plates 16—16 are also provided adapted to be secured to the end plates 12—12 by a plurality of rivets 17—17 or the like. Said cover plates 16—16 are provided with a centrally disposed portion 30 conically shaped to conform to the outer or out-board end of the bearing 15 and adapted to be held in spaced relation thereto by a washer 18—18. Said cover plates 16 are further provided with an annular outer peripheral groove 19—19 adjacent an axially extending outer peripheral flange 20, said flange adapted to be secured to the upwardly extending surface portions of the end plates 12—12 by the said rivets 17—17.

A plurality of preferably circular perforations 31 are provided in said cover plates and are circumferentially and evenly disposed about and spaced from the central portion 30 thereof. A plurality, preferably three, tabs 32 are disposed at the outer periphery of the generally cylindrical end plates 12 and are provided with perforations 33 to receive the rivets 17—17. Bolts and lock washers 34—34 and 35—35 respectively are adapted to receive each of the end plates 12—12 as shown at 12" and are disposed at either end of the said central housing portion 11 in assembled relationship in a manner well known in the art to which my invention appertains.

An armature shaft 50 connected to an armature 51 is projected through the central opening 14 in the end plates 12 as shown in Fig. 1, and the bearing 15 is telescoped thereover. A sleeve or collar element 60 is then telescoped over the outer or out-board end of the bearing 15 and comprises a centrally apertured dome-cup-formed portion 61, and an outwardly extending flange 62 having a downwardly extending peripheral edge 63.

A bearing retainer spring element 70, or spider, as best illustrated in Figs. 1 and 5, formed of a substantially star-like flat metallic element, preferably having six evenly spaced arms or projections 71 is then disposed upon the element 60. The arms 71 of the element 70 terminate and unite in a disc-like center portion 73 centrally apertured at 72 and the said arms are provided with elongated slots 72' opening into said aperture and extending longitudinally of said projections. As shown in Fig. 1, the inner peripheral edge 75 of said element 70 is seated upon the circular flange 62 of the formed collar 60 and the outer peripheral edges 76 of the arms 71 contact the downwardly projecting rib formed by the groove 19 of the cover plate 16 when the cover plate 16 is secured to the end plate 12.

It will be observed that the formed collar 60 disposed between the bearing retainer spring 70 and the spherical surface of the bearing 15 provides a smooth, low-friction rubbing surface with the spherical bearing, permitting it to align itself with the shaft axis with a minimum of effort.

It should be further observed that the bearing retainer spring 70 is flat and preferably remains so throughout the heat treating and assembly operations, resulting in a minimum of distortion thus providing even pressure upon the collar 60.

It will further be observed that the bearing retainer spring exerts an even holding power upon the spherical bearing surface and that the cover having a conical center portion provides a definite belt on the outer surface of the bearing at their point of contact.

It will be readily understood by those skilled in the art to which my invention appertains that the bearing is easily located and retained in position by the improved construction of my invention and that the improved spring retainer means of my invention assist in retaining the bearing in position with a minimum of sideways vibrational movement.

It will also be understood that although I have described my invention in connection with a preferred embodiment that numerous and extensive departures may be made therein without however departing from the spirit of my invention and the scope of the appended claims.

What I claim is:

1. Bearing structures comprising a cup shaped end plate, said end plate having a centrally disposed bearing seat portion, said seat portion being centrally perforated, the inner peripheral portions of said seat portion being provided with a shoulder portion, a generally ball-shaped bearing having inboard and outboard portions, said inboard portion seating upon said shoulder portion, a cover plate, securing means securing said cover plate to said end plate, said cover plate provided with a centrally disposed portion conically shaped to conform to the outboard end of the bearing and being spaced therefrom and having an annular outer peripheral groove therein, a collar element having a generally dome-shaped portion and outwardly extending flange portion, said dome-shaped portion being centrally perforated and telescoped over an outboard end of said bearing, a bearing retainer spring element having an annular centrally perforated portion and a plurality of arm portions outwardly projecting therefrom, said arm portions having longitudinally extending slots therein, said slots communicating with said centrally disposed perforation in the spring element, the inner peripheral flange of said spring element being seated upon the outwardly extending flange portion of said collar element and a portion of each of said arms contacting the under surfaces of said grooved portion of the said cover plate.

2. A bearing structure comprising a generally ball-shaped bearing having inboard and outboard portions, an end plate having a centrally disposed opening, a circular shoulder surrounding said opening, a circular cover plate having a centrally positioned conically formed surface, said cover plate being secured to the said end plate, a collar element adapted to be telescoped over the outboard end of the bearing and consisting of a substantially conically formed sleeve portion and an outwardly extending circular flange portion, a substantially flat generally star-shaped bearing retainer spring element, said retainer element being centrally apertured and telescoped over the sleeve portion of said collar element and being seated upon the flange portion of said collar element and contacting a portion of the undersurface of said cover plate, the bearing being seated at its inboard end upon the said circular shoulder of the end plate, the retainer element exerting even retaining pressure upon the ball-shaped bearing surface.

3. Bearing structures of the type claimed in claim 1, characterized by the provision of a plurality of evenly spaced air openings disposed about the inner peripheral edge of said cover plate and a plurality of evenly spaced air openings disposed about the inner peripheral edge of said end plate.

References Cited in the file of this patent

UNITED STATES PATENTS 2,316,693    Hoddy  ---------------- Apr. 13, 1943

FOREIGN PATENTS 897,635    Germany  -------------- Dec. 21, 1953